United States Patent
Kimura (10) Patent No.: US 8,531,730 B2
(45) Date of Patent: Sep. 10, 2013

(54) PRINTING DEVICE, AND CONTROL METHOD OF PRINTING DEVICE

(75) Inventor: Yusuke Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 12/842,572

(22) Filed: Jul. 23, 2010

(65) Prior Publication Data

US 2011/0038011 A1 Feb. 17, 2011

(30) Foreign Application Priority Data

Aug. 13, 2009 (JP) ................................ 2009-187790
Nov. 11, 2009 (JP) ................................ 2009-258113

(51) Int. Cl.
*G06K 15/02* (2006.01)
(52) U.S. Cl.
USPC .......................................... 358/3.24; 358/1.9
(58) Field of Classification Search
USPC ............ 358/1.9, 3.24, 3.26, 1.15, 1.1; 399/54
See application file for complete search history.

(56) References Cited

U.S. PATENT DOCUMENTS

| | | | | |
|---|---|---|---|---|
| 4,965,625 A | * | 10/1990 | Sakakibara et al. | 355/35 |
| 5,687,300 A | * | 11/1997 | Cooper | 358/1.9 |
| 2003/0053102 A1 | * | 3/2003 | Kelsey | 358/1.13 |
| 2003/0053117 A1 | * | 3/2003 | Payne et al. | 358/1.15 |
| 2005/0243340 A1 | * | 11/2005 | Tai et al. | 358/1.9 |

FOREIGN PATENT DOCUMENTS

JP 2000-003084 1/2000

* cited by examiner

*Primary Examiner* — Kimberly A Williams
(74) *Attorney, Agent, or Firm* — Fitzpatrick, Cella, Harper & Scinto (57) ABSTRACT

A problem to be solved by the present invention is to reduce workload of setting colors that are most suitable for printing image data. In order to solve the problem, a printing device according to the present invention is a printing device that can be loaded with M color materials, comprising: an acquisition unit that acquires image data; an analysis unit that analyzes the image data acquired by the acquisition unit; and a determination unit that determines, based on the analysis result by the analysis unit, N priority colors from colors of the M color materials where N is a number less than M.

8 Claims, 9 Drawing Sheets

| PRINTING COLOR | PAPER FEED SETTING | PAPER EJECTION SETTING | PAGE SETTING |
|---|---|---|---|

—BASIC SETTING

—SINGLE-COLOR SETTING

—TWO-COLOR SETTING  501

―TWO-COLOR SETTING――――――――――――――――

BASIC COLOR SETTING

FIRST COLOR  [Red ▶]

PRIORITY COLOR SETTING

| PRIORITY | PRIORITY OBJECT | | PRIORITY MINIMUM SIZE | | PRIORITY COLOR | |
|---|---|---|---|---|---|---|
| 1 | TEXT | ▶ | 8pt | ▶ | Magenta | ▶ |
| 2 | TEXT | ▶ | 6pt | ▶ | Yellow | ▶ |
| 3 | GRAPHIC | ▶ | SMALL | ▶ | Magenta | ▶ |
| 4 | IMAGE | ▶ | MEDIUM | ▶ | Yellow | ▶ |
| | | | | | Black | |

[OK] [CANCEL] [APPLY]

[HELP]

PRINTING DEVICE, AND CONTROL METHOD OF PRINTING DEVICE

BACKGROUND OF THE INVENTION

1. Field of the Invention

The present invention relates to a printing device, a control method of a printing device, and a program.

2. Description of the Related Art

CMYK four-color printing (full-color printing) is common in the printing industry. Full-color printing, however, is accompanied with a high cost because color materials (toner or ink) for four colors are required. In such a situation, N-color printing is now drawing attention (N is two or more and not more than M−1 where M is the number of color materials that can be loaded on the printing device. For example, N is 2 or 3 for a four-color printing device).

Japanese Patent Laid-Open No. 2000-003084 discloses a two-color printing technique. According to Japanese Patent Laid-Open No. 2000-003084, a user selects two colors and performs printing using the two colors.

However, it is a burden for the user to select N colors that are most suitable for use in printing. If, for example, the document to be printed has 90 pages, the user must determine which N colors are most suitable, referring to the 40-page document. The present invention therefore automatically determines the most suitable N colors for the image data that has been input when performing N-color printing of the input image data by analyzing the information of the input image data. It is thus an object of the present invention to provide a printing device that performs N-color printing of the image data based on the result of determination.

SUMMARY OF THE INVENTION

In order to solve the above problems, a printing device according to the present invention is a printing device that can be loaded with M color materials and comprises an acquisition unit that acquires image data; an analysis unit that analyzes the image data acquired by the acquisition unit; and a determination unit that determines, based on the analysis result by the analysis unit, N priority colors from colors of the M color materials where N is a number less than M.

According to the present invention, workload of setting the colors that are most suitable for printing the image data can be reduced.

Further features of the present invention will become apparent from the following description of exemplary embodiments (with reference to the attached drawings).

DESCRIPTION OF THE EMBODIMENTS

The present invention will be described below referring to drawings.

Embodiment 1

Figure 2:
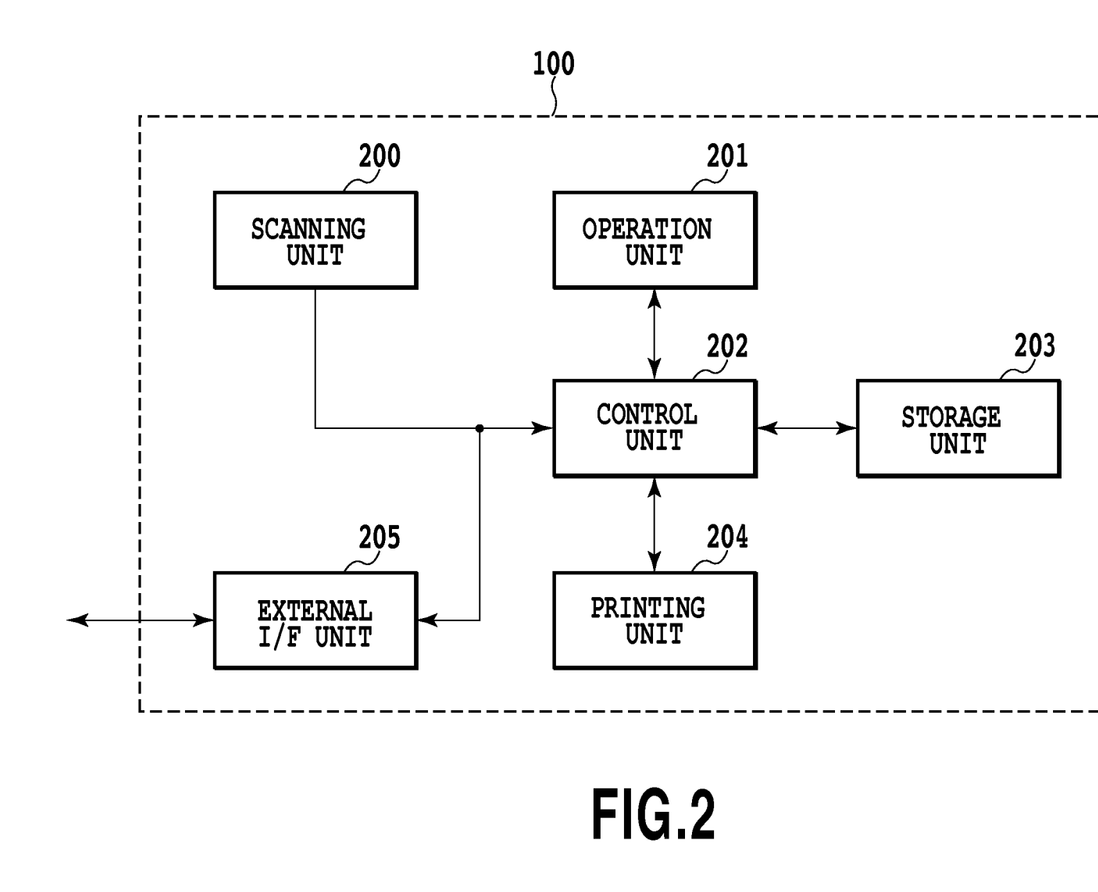
FIG. 2 is a block diagram illustrating an exemplary printing device in the present invention.

FIG. 2 is a block diagram illustrating an exemplary printing device 100 in each embodiment. In the example of FIG. 2, the printing device 100 is an MFP (Multi Function Peripheral) having a plurality of functions such as copying function, printing function, and the like. The printing device 100 may be a single-function printing device having only the copying function or only the printing function.

In the printing device 100, a scanning unit 200 reads an image on a manuscript to convert it into image data, and transfers the image data to another unit.

An operation unit 201 has an operation panel described below and receives instructions from a user via the panel. The operation unit 201 performs a variety of presentation on the operation panel.

An external I/F unit 205 transmits and receives data between other devices connected to a network and the printing device 100.

A storage unit 203 is a mass storage device for storing data input from the scanning unit 200 or the external I/F unit 205. The storage unit 203 may be a hard disk or a flash memory.

A printing unit 204 prints an image based on image data that has been read by and input to the printing device 100.

A control unit 202 controls processing and operation of various units included in the printing device 100. The control unit 202 performs, based on a program in a ROM under control thereof, a processing shown in the flowchart described below.

Although the control unit 202 and the printing unit 204 are described such that they exist within the printing device 100, the control unit 202 and the printing unit 204 may be provided outside the printing device 100.

Figure 1:
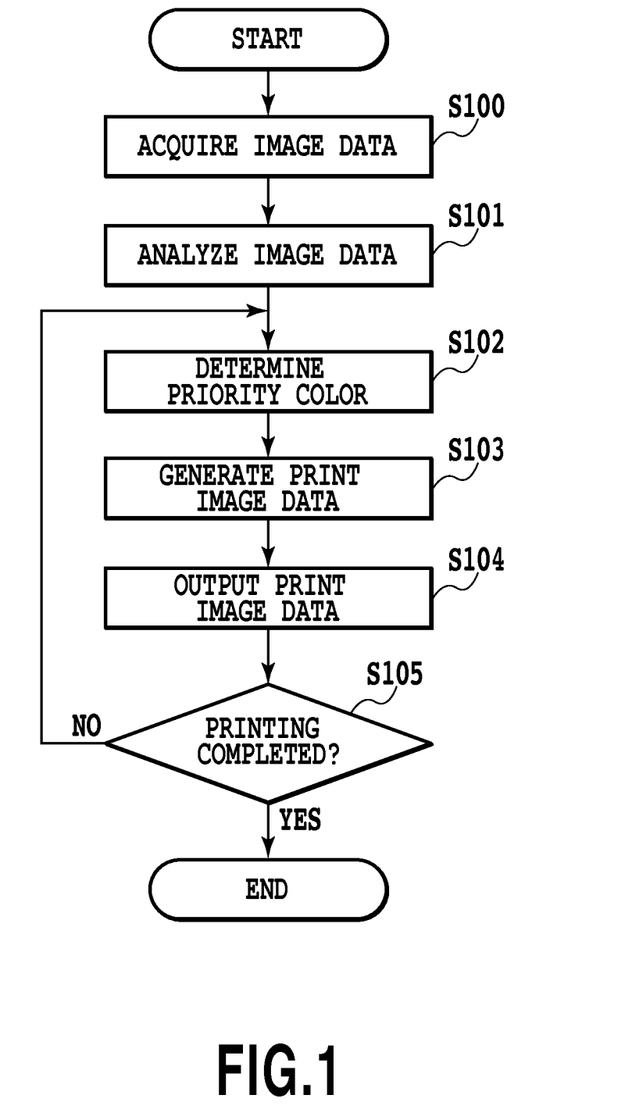
FIG. 1 is a flowchart illustrating an exemplary printing process in an embodiment 1 of the present invention.

In the following, a process flow will be described in which, the printing device 100, by analyzing information of image data that has been input to the printing device 100, automatically selects and determines the most suitable colors for the image data as priority colors based on the analysis result, and performs printing using the priority colors. FIG. 1 shows an exemplary flow of the processing according to the embodiment 1.

First, at step S100, the control unit 202 of the printing device 100 acquires image data from the scanning unit 200 or the external I/F unit 205. Next, at step S101, the control unit 202 analyzes the image data acquired at step S100. More specifically, the control unit 202 performs the following processing.

First, at step S101, the control unit 202 generates RGB color format image data and CMYK color format image data from the image data acquired at step S100. If the image data acquired at step S100 is in one of RGB and CMYK color formats, the control unit 202 generates image data only in one of RGB and CMYK color formats. In other words, if the color format of the image data acquired at step S100 is RGB, the control unit 202 generates CMYK image data from the RGB image data. If, otherwise, the color format of the image data acquired at step S100 is CMYK, the control unit 202 generates RGB image data from the CMYK image data. As a color format conversion equation of the image data, the following is used (when range of values of R, G, B, C, M, Y and K is 0 to 255 (8 bit)). The following conversion equation is only an example. There are many well-known literatures with regard to conversion equations of image data color formats, any of which may be used.

$$K=\min(255-R, 255-G, 255-B)$$

$$C=-255-R-K$$

$$M=-255-G-K$$

$$Y=-255-B-K \quad \text{[Equation 1]}$$

In addition, image data in RGB color format is generated from CMYK image data according to the following conversion equation (when range of values of R, G, B, C, M, Y and K is 0-255 (8 bit)).

$$R=\max(0, (255-C-K))$$

$$G=\max(0, (255-M-K))$$

$$B=\max(0, (255-Y-K)) \quad \text{[Equation 2]}$$

In the above conversion equation, C, M, Y and K each denote the density of each color in each pixel of the image data, and also R, G and B each denote the density of each color in each pixel of the image data.

At step S101, the control unit 202 analyzes the image data according to the following processing. First, the control unit 202 analyzes the used amount of each of CMYK colors, using the image data in CMYK color format. The control unit 202 then analyzes the used amount of each of RGB colors using the image data in RGB color format. Upon completion of the above processing, the process flow proceeds to step S102.

As an exemplary analysis used at step S101, it is conceivable to count the density of R, G, B, C, M, Y and K for each pixel and measure (calculate) the total number of pixels Cr, Cg, Cb, Cc, Cm, Cy and Ck of each of the colors R, G, B, C, M, Y and K. In such an analysis, the control unit 202 counts the total number of pixels having a density equal to or higher than a threshold. Specifically, the control unit 202 counts the number of pixels having a density equal to or higher than the threshold (128) for each of R, G, B, C, M, Y and K, and sets the numbers of pixels as the total number of pixels Cr, Cg, Cb, Cc, Cm, Cy and Ck. In this case, result of count (total number of pixels)=result of measurement (calculation)=result of analysis holds.

Any other analysis may be used as the analysis used at step S101. For example, if there are two pixels for R=140, G=0 and B=0 (each denoting density), the control unit 202 may use Cr=2*128/255 instead of Cr=2. In other words, the control unit 202 may set the number of pixels having a density equal to or higher than the threshold×average density (in all the pixels having a density equal to or higher than the threshold) as the total number of pixels. In addition, the control unit 202 may set the density per number of pixels×pixel as the total number of pixels.

After step S102, it is assumed that the control unit 202 performs the processes focusing on data corresponding to one page of the acquired image data. At step S102, the control unit 202 selects a color to be prioritized from seven candidate colors (R, G, B, C, M, Y and K) based on the analysis result of step S101 (type and used amount of colors) and determines it as the priority color. When determining a color to be the priority color, the control unit 202 may determine the top two colors, for example, that are most used in the image data as the priority colors. The control unit 202 uses the color which is most used in the image data as is, and determines the second most used color as the priority color in the rest of the image data. For example, if Color1 having the largest number of pixels is black and Color2 having the second largest number of pixels is cyan, the control unit 202 determines the two colors Color1 and Color2 according to the following equation.

$$\text{Color1}=\max(Cr, Cg, Cb, Cc, Cm, Cy, Ck)$$

$$\text{Color2}=\max(Cr, Cg, Cb, Cc, Cm, Cy) \quad \text{[Equation 3]}$$

Since Ck has already been selected as Color1, Ck is not included in the equation of Color2. Additionally, in the equation of Color1, max(Cr, Cg, Cb, Cc, Cm, Cy, Ck) outputs the color corresponding to the maximum value of Cr, Cg, Cb, Cc, Cm, Cy and Ck. If there are two or more colors that take the maximum value (e.g., Cr=Cg=Cb), max (Cr, Cg, Cb, Cc, Cm, Cy, Ck) outputs the leftmost color (i.e., R). Max (Cr, Cg, Cb, Cc, Cm, Cy) in the equation of Color2 also outputs the color corresponding to the maximum value of Cr, Cg, Cb, Cc, Cm and Cy. If there are two or more colors that take the maximum value (e.g., Cr=Cg=Cb), max (Cr, Cg, Cb, Cc, Cm, Cy) outputs the leftmost color (i.e., R). Color1 and Color2 may be automatically selected so as to satisfy a conditional equation specified otherwise.

At step S103, the control unit 202 generates print image data to print the image using only the priority color determined at step S102 and outputs the print image data to the printing unit 204 at step S104.

For example, if two of the CMYK colors (e.g., C and M) are determined as the priority colors at step S102, the control unit 202 sets the density of the remaining two colors (e.g., Y and K) of the CMYK image data to zero for all pixels. In this case, the control unit 202 sets, as the print image data, the CMYK image data having a density of Y and K set to zero for all pixels.

For example, if two of RGB colors (e.g., R and G) are determined as the priority colors at step S102, the control unit 202 sets the density of the remaining one color (e.g., B) of the RGB image data to zero for all pixels. The control unit 202 then converts the RGB image data into CMYK image data using the above color format conversion equation. For example, if there is image data with R=140, G=100, and B=10 for all pixels, the process is as follows. First, the control unit 202 generates image data with R=140, G=100, and B=0. The control unit 202 then sets the CMYK image data with C=0, M=40, Y=140, K=115 as the print image data, using the above color format conversion equation.

For example, if one of the RGB colors (e.g., R) and one of the CMYK colors (e.g., Y) are determined as the priority colors at step S102, the processing may be different depending on whether Color1 is RGB or CMYK, as follows.

If Color1 is one of RGB colors, the control unit 202 determines whether or not the condition that the density of Color1 (e.g., R)>=128 and the condition that the density of the colors other than Color1 (e.g., each of G and B)<128 in the pixels of interest are satisfied.

If it is determined that the above conditions are satisfied, the control unit 202 sets the density of the remaining two colors of the RGB image data (e.g., G and B) in the pixels of interest to zero. The control unit 202 then converts the RGB image data into CMYK image data, using the above color format conversion equation. In this case, the pixels of interest will be printed using M and Y. In other words, if only one of the RGB colors in the pixels of interest is dark, only that dark color is printed with fidelity. As a result, although Color2 will be ignored, Color2 in many cases is a color (e.g., M or Y) composing the only one dark color (e.g., R) of the RGB colors. Therefore, substantially, Color2 will not be ignored.

If, on the other hand, the density of two or more of RGB colors exceeds 128 or all three of RGB colors have a density less than 128 in the pixels of interest, the control unit 202 converts the RGB image data into CMYK image data, using the above color format conversion equation. The control unit 202 then sets the density of the colors other than the color of Color2 (e.g., Y) to zero. The control unit 202 then sets the CMYK image data as the print image data. In this case, the pixels of interest are eventually printed using Y. That is, if the density of two or more of RGB colors is dark, exceeding 128, the color (e.g., Y) composed of the two colors (e.g., R and G) is set as Color2, and the pixels of interest are printed using Color2. If, on the other hand, the density of all three of RGB colors is less than 128, the pixels of interest are printed using Color2, with none of RGB colors being particularly emphasized.

If, on the other hand, Color1 is any one of CMYK, the control unit 202 first converts the RGB image data into CMYK image data using the above color format conversion equation. The control unit 202 then determines whether or not the condition that the density of Color1 (e.g., Y)>=128 and the condition that the density of the colors other than Color1 (each of C, M and K)<128 are satisfied in the pixels of interest of the CMYK image data.

If it is determined that the condition that the density of Color1 (e.g., Y)>=128 and the condition that the density of the colors other than Color1 (each of C, M and K)<128 are satisfied, the control unit 202 performs the processing as described below. That is, the control unit 202 sets, in the pixels of interest, the density of the remaining three colors (e.g., C, M and K) of the CMYK image data to zero. In other words, the pixels of interest are printed using the only one dark color. In this case, although Color2 is formally ignored, Color2 will not be substantially ignored for the same reason as described above.

Additionally, in the pixels of interest that do not satisfy the above condition ((i.e., not only one color is dark), the control unit 202 sets the density of the colors other than the color of Color2 (e.g., R) to zero in the RGB image data and converts the RGB image data into CMYK image data, using the above color format conversion equation. The control unit 202 then sets the CMYK image data as the print image data. In other words, the pixels of interest are printed using Color2 if the density of Color1 is not thick.

At step S105, if the acquired image data includes a plurality of pages, the control unit 202 determines whether or not all pages have been processed and printing thereof has been completed, and the process proceeds to step S102 if it is determined that not all pages have been printed.

If it is determined at step S105 that all pages have been printed, the process terminates.

After the process of the flowchart shown in FIG. 1 terminates, the image data is sent from the control unit 202 to the printing unit 204, where the image data is printed. This is similar in other embodiments.

The present invention is not limited to the embodiment described above and can be implemented through appropriate modifications without deviating from the scope of its spirit.

As a result of performing the process as described above, there may be a case, for example, that three-color printing is performed although two priority colors have been determined, if it is determined by the control unit 202 that the image data satisfies a special condition based on the analysis result of the image data at step S101. If, on the other hand, it is determined by the control unit 202 that the image data does not satisfy a special condition, the image data is printed by the two priority colors determined based on the analysis result of the image data. It is when two colors in complementary color relation are determined as the priority colors, e.g., B for Color1 and Y for Color2, that the image data is determined to satisfy a special condition and three-color printing is performed. In other words, the control unit 202 increases the number of priority colors from two to three when the priority colors are in complementary color relation. Actually, however, the possibility that two colors in complementary color relation are determined as the priority colors is low. Additionally, even if two colors in complementary color relation are determined as the priority colors, the total amount of used color materials decreases than that of four colors, the effect according to the present invention is assured to be realized. There may also be a case in other embodiments according to the present invention described below where three-color printing is performed despite that two priority colors have been determined, this is allowed in the present invention for a similar reason. Additionally, three priority colors may be determined in the embodiments according to the present invention. Furthermore, in an embodiment according to the present invention, two or more colors, and N colors of M−1 or less colors where M is the number of color materials that can be loaded on the printing device may be determined as the priority colors.

Embodiment 2

In the embodiment 1, a process flow has been described where the most suitable color is automatically selected and determined as the priority color, and printing is performed using the priority color. However, there may be a case where it is better to use only one color to perform printing if a special condition is satisfied such that there are only black characters on the image.

Figure 3:
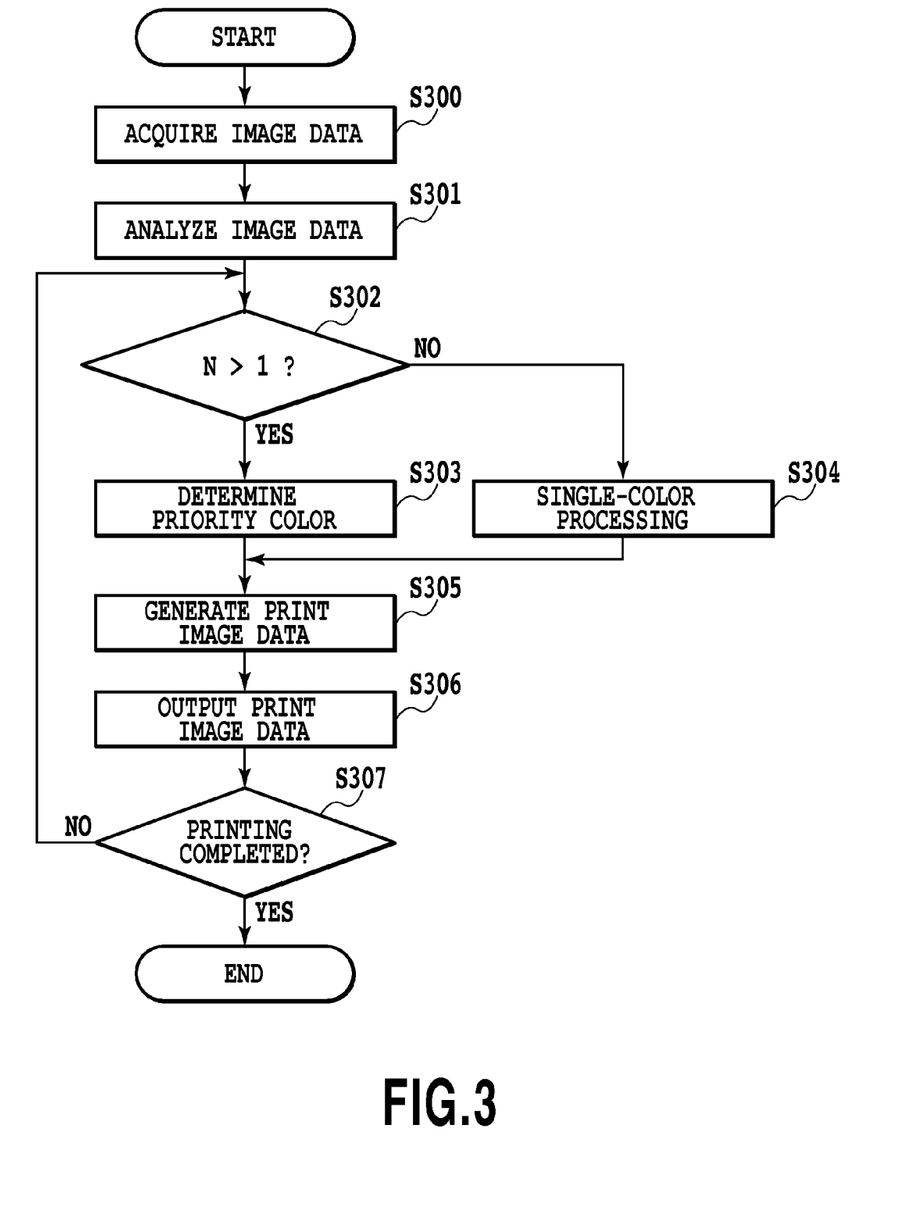
FIG. 3 is a flowchart illustrating an exemplary printing process of an embodiment 2 of the present invention.

In the embodiment 2, therefore, a flow will be described where N colors that are most suitable for printing the image data are automatically selected and determined as the priority colors by analyzing the image data and printing is performed using the N priority colors. FIG. 3 is an exemplary flow of the embodiment 2. In the following, only the part that is different from FIG. 1 of the embodiment 1 will be described with regard to FIG. 3.

The processes of step S100 and step S300 are identical. In addition, processes of step S101 and step S301 are identical.

At step S302, the control unit 202 checks the analysis result of step S301 (total number of pixels Cr, Cg, Cb, Cc, Cm, Cy and Ck of respective colors R, G, B, C, M, Y and K). Here, calculation of Cr, Cg, Cb, Cc, Cm, Cy and Ck is similar to that of the embodiment 1. The control unit 202 determines that N=1 if "maximum value of the density values of R, G, B, C, M, Y and K"/"the second largest value of the density values of R, G, B, C, M, Y and K" exceeds the threshold (S). That is, the control unit 202 determines that N=1 if it is determined that a special condition is satisfied such that only one color is outstandingly large in the image data based on the analysis result of step S301. In addition, the control unit 202 determines that N=2 if "the largest value of density values of R, G, B, C, M, Y and K"/"the second largest value of density values of R, G, B, C, M, Y and K" does not exceed the threshold (S). In other words, the control unit 202 determines that N=2 if it is determined that a special condition is not satisfied such that only one color is outstandingly large in the image data based on the analysis result of step S301.

At step S302, the control unit 202 proceeds to the process of step S303 if N>1 for the image data acquired at step S300. The processes of step S102 and step S303 are identical.

At step S302, on the other hand, the control unit 202 proceeds to the process of step S304 if N=1 holds in the image data acquired at step S300.

At step S304, the control unit 202 determines Color1, which is a color used for single-color printing, using the calculation equation below.

Color1=max(Cr,Cg,Cb,Cc,Cm,Cy,Ck)　　　　[Equation 4]

In other words, if it is determined as the analysis result of step S301 that N=1 at step S302 (the image data acquired at step S301 is suitable for single-color printing), a color (Color1) is determined as the color (priority color) to print the image data according to the above calculation equation.

At step S305, the control unit 202 generates print image data to print the image using only N colors determined at step S302, and the print image data is output to the printing unit 204 at step S306. The process of generating print image data for N=2 is identical to the process of step S103 of the embodiment 1. Generation of print image data for N=1 is described below. For example, if one of RGB colors (e.g., R) is selected as Color1, the control unit 202 sets the density of the remaining two colors (e.g., G and B) of the RGB image data to zero for all pixels. Subsequently, the control unit 202 converts the RGB image data into CMYK image data, and sets the CMYK image data as the print image data. For example, if there is image data with R=140, G=100 and B=10 for all pixels, image data with R=140, G=0 and B=0 for all pixels is generated. Additionally, the control unit 202 sets C=0, M=140, Y=140 and K=115, using the above color format conversion equation. The control unit 202 then sets the CMYK image data as the print image data. Next, at step S307, if the acquired image data includes a plurality of pages, the control unit 202 determines whether or not all pages have been processed and printing thereof has been completed, and the process proceeds to step S302 if it is determined that printing of all pages has not been completed.

If it is determined at step S307 that printing of all pages has been completed, the process terminates.

With the above process, one of M−1 or less colors is determined as the priority color, where M is the number of color materials that can be loaded on the printing device.

The present invention is not limited to the embodiments described above and illustrated in the drawings and can be implemented through appropriate modifications without deviating from the scope of its spirit.

Embodiment 3

Embodiments 1 and 2 automatically select and determine N colors (e.g., two or three colors) that are most suitable for printing image data as the priority colors by analyzing the image data.

With the embodiment 3, N colors that are most suitable for printing the image data (e.g., two or three colors) are automatically selected and determined as the priority colors under a certain restriction condition given by the user, based on the analysis result of the image data.

Figure 4:
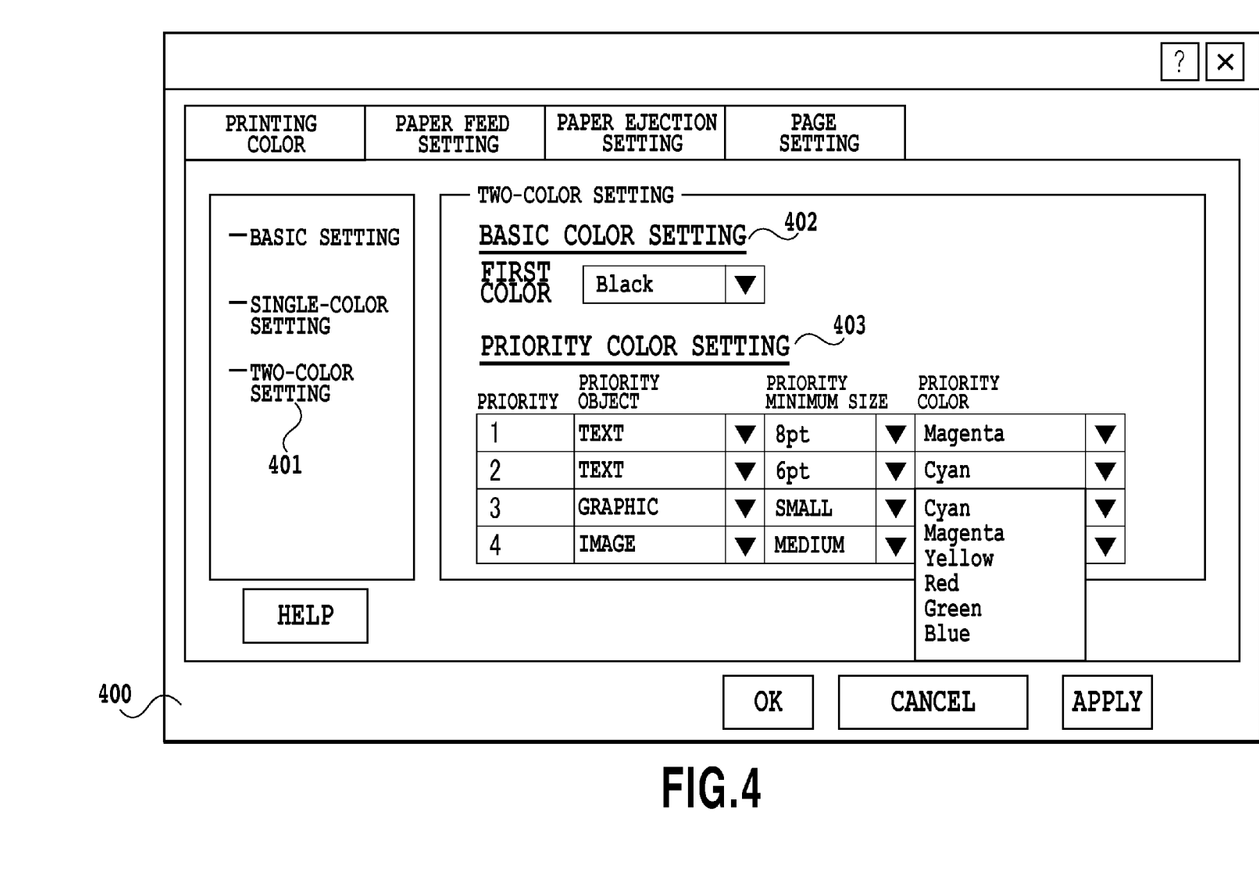
FIG. 4 is an exemplary operation panel in an embodiment 3.

The restriction condition used in the embodiment 3 will be described using FIG. 4. FIG. 4 is an exemplary screen of the operation panel in embodiment 3. In a two-color setting 401 that performs setting of two-color printing, an operation panel 400 that received a first basic color setting 402 and a priority color setting 403 from the user notifies the reception to the control unit 202. In the case of the embodiment 3, characteristics such as type, size, color and color priority of an object in the image data are received from the user as a restriction condition with regard to the image data in the priority color setting 403.

The control unit 202 automatically selects and determines colors that are most suitable for pages of the image data satisfying the restriction condition received from the user as N priority colors, in specifying priority colors at step S102 in FIG. 1 or step S303 in FIG. 3. That is, with the embodiment 3, specification of priority colors is performed according to the restriction condition with regard to the image data, which the control unit 202 receives from the user. In other words, with the embodiment 3, the control unit 202 receives specification of priority colors from the user in a manner receiving the specification of the restriction condition from the user with regard to the image data.

Since the process flow is approximately similar to that of FIG. 1 of the above embodiments, only the different part will be described below. At step S101, the control unit 202 analyzes the image data acquired at step S100, similarly to the embodiment 1. The control unit 202 then acquires the analysis result (type and used amount of colors used in the image data). In the priority color determination at step S102 of FIG. 1, the control unit 202 selects, as Color1, the first color specified in the first basic color setting 402. In addition, the control unit 202 determines the color of Color2 from the total number of pixels Cr, Cg, Cb, Cc, Cm, Cy and Ck which have been calculated considering whether or not a color satisfying the restriction condition is included in the image data acquired in the order of priority. For example, if "text, 8 pt, and magenta" is specified as the restriction condition for the first priority, the control unit 202 performs the following process. First, the control unit 202 counts the number of pixels with the attribute of objects in the image data being texts, the font size being 8 pt or more, and the density of magenta being the threshold (128) or more, and denote it as Cm'. If Cm' is the threshold (e.g., 1) or more, the control unit 202 sets Color2=M. If Cm' does not exceed the threshold, the control unit 202 similarly counts the number of pixels with regard to the restriction conditions for the second and following priorities, and determines Color2. If all restriction conditions received from the operation panel are not satisfied, printing may be performed using only the one color set as Color1.

At step S103 of FIG. 1, the control unit 202 generates print image data to print the image using the N colors determined at step S102, and outputs the print image data to the printing unit 204 at step S104. In the process of generating print image data, the calculation equation identical to that of the embodiment 2 is used.

At step S103, the control unit 202 generates print image data to print the image using only the priority color determined at step S102, and outputs the print image data to the printing unit 204 at step S104. The embodiment 3 is different from the embodiments 1 and 2 in that only the pixels satisfying the priority color restriction condition determined at step S102 are printed using Color2 and the other regions are printed using Color1. For example, two of the CMYK colors (e.g., C and M) are determined as the priority colors, and the control unit 202 performs the following process if the priority color having the restriction condition of "text, 8 pt, and magenta" is Color2. In other words, the control unit 202 sets the density of the remaining three colors (e.g., C, Y and K) of the image data to zero for CMYK pixels with the attribute of objects in the image data being texts, the font size being 8 pt or more, and the density of magenta being the threshold (128) or more. In addition, the control unit 202 sets the density of the remaining three colors (e.g., M, Y and K) of the image data to zero for the pixels that do not satisfy the restriction condition. The CMYK image data is then set as the print image data.

Figure 5:
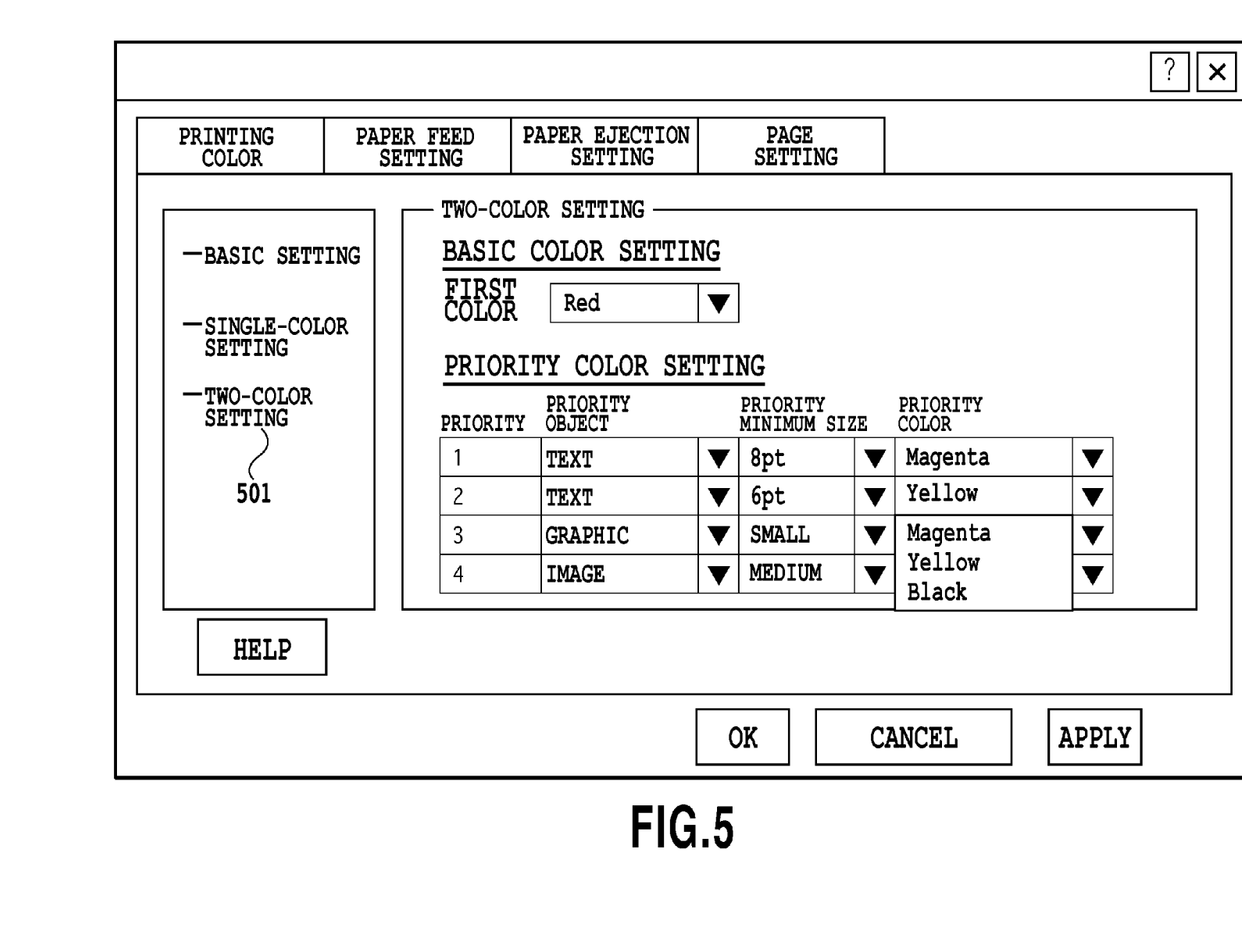
FIG. 5 is an exemplary operation panel in a variation of the embodiment 3.

Additionally, as an exemplary variation of the embodiment 3, priority color restriction will be described using FIG. 5. In the present invention, when the user selects, for example, two colors from a two-color setting 501 of the operation panel to perform two-color printing, the control unit 202 restricts, depending on the selection of the first color, the second selectable priority color to prohibit printing using three-color toner that does not contain black.

Furthermore, in the embodiments according to the present invention, N colors of two or more colors and not more than M−1 colors may be determined as the priority colors, where M is the number of color materials that can be loaded on the printing device.

Embodiment 4

In the embodiment 4, if no color corresponding to N (e.g., two or three) priority colors has been found by the process at S102 of FIG. 1 based on the analysis result of the image data, the control unit 202 preliminarily receives from the user the color to be set as the priority color. Also in the embodiment 4, the control unit 202 analyzes, at step S101 (step S301), the image data acquired at step S100 (step S300), similarly to the embodiments 1 and 2. The control unit 202 then acquires the analysis result (type and used amount of colors used in the image data).

Figure 6:
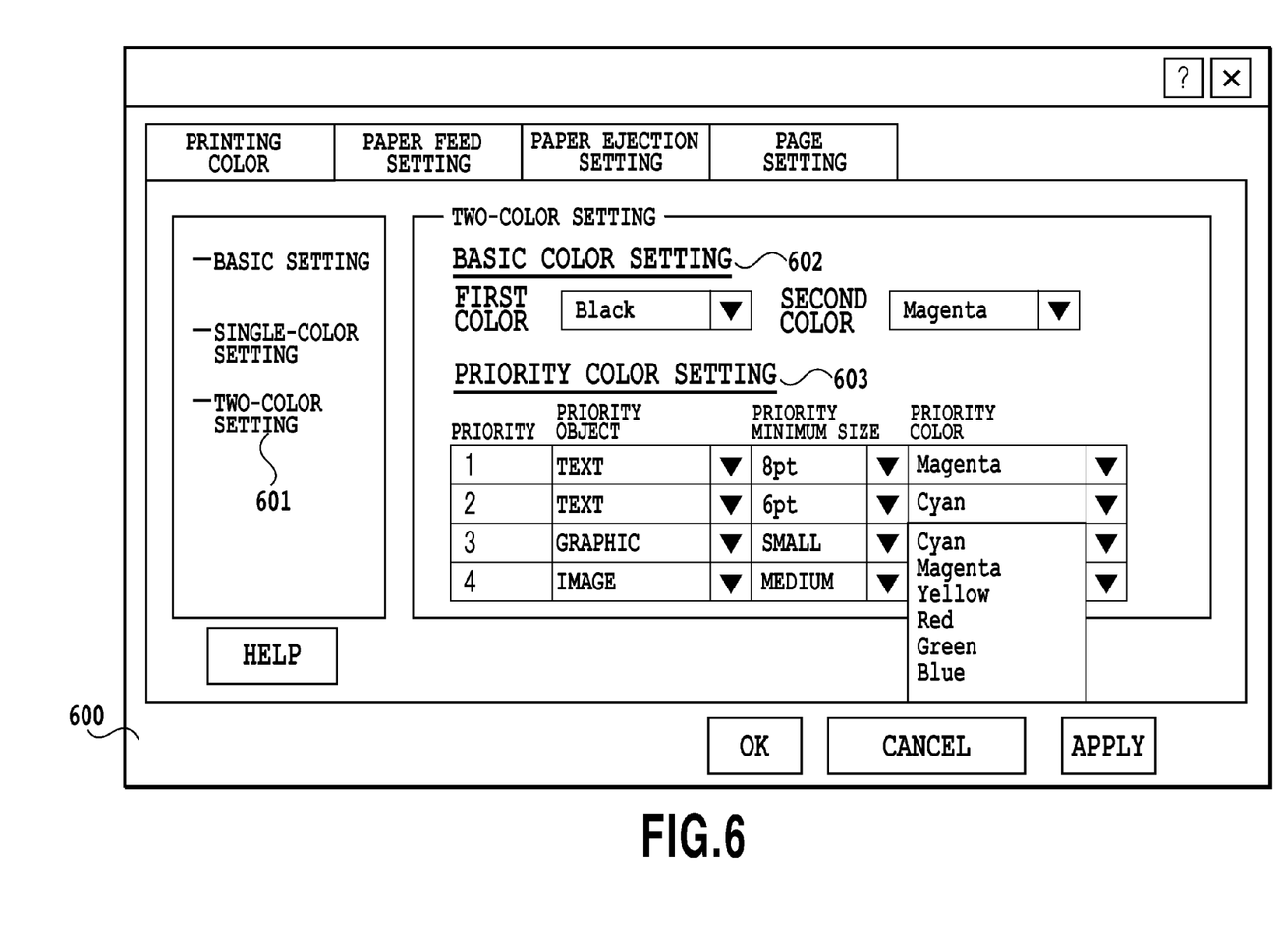
FIG. 6 is an exemplary operation panel in an embodiment 4.

The embodiment 4 will be described using FIG. 6. FIG. 6 shows an exemplary screen of an operation panel in the embodiment 4. In a two-color setting 601 that sets a two-color printing, an operation panel 600 that received a first and second basic color setting 602 and a priority color setting 603 from the user notifies the reception to the control unit 202. In the case of the embodiment 9, characteristics such as type, size, color and color priority of an object in the image data are received from the user as a restriction condition in the priority color setting 603.

In the priority color determination at step S102 in FIG. 1 or step S303 in FIG. 3, the control unit 202 automatically selects colors that are most suitable for pages of the image data satisfying the condition under certain restriction conditions given by the user. If the restriction conditions are not satisfied, the control unit 202 automatically determines the second color of the basic color setting 602 as the priority color.

Since the process flow of the embodiment 4 is approximately similar to that of the embodiment 3 described above, only the part different from the embodiment 3 is described below. In the priority color determination at step S102 of FIG. 1, the control unit 202 selects, as Color1, the first color specified in the first basic color setting 402. For Color2, the control unit 202 determines the color of Color2 from the total number of pixels Cr, Cg, Cb, Cc, Cm, Cy and Ck which have been calculated considering whether or not a color satisfying the restriction condition is included in the acquired image data. If all restriction conditions received from the operation panel are not satisfied, the control unit 202 sets the second color of the basic color setting 602 as Color2. If, for example, the first color is set to black and the second color is set to magenta in the basic color setting 602, and image data that does not satisfy all restriction conditions is to be printed, the control unit 202 performs the following process.

If the first priority restriction condition as shown in FIG. 6 is specified, the control unit 202 counts the number of pixels with the attribute of objects in the image data being texts, the font size being 8 pt or more, and the density of magenta being the threshold (128) or more, and denotes it as Cm'. If Cm' does not exceed the threshold, the control unit 202 similarly counts the number of pixels with regard to the restriction condition for the second and following priorities, and determines Color2. In this case, since all restriction conditions received from the operation panel are not satisfied, the control unit 202 determines the priority colors such that Color1 is black and Color2 is magenta.

Embodiment 5

In the following, an embodiment 5 that restricts the priority colors will be described using FIG. 5 as a variation of the embodiment 3. For example, in the present embodiment, if two colors are selected from the two-color setting 501 of the operation panel to perform two-color printing, the control unit 202 restricts, depending on the selection of the first color, the second selectable priority color to prohibit printing using three-color toner that does not contain black. That is, in the present embodiment, if there are a plurality of priority colors, reception of a type of priority color other than the first priority color is restricted depending on the type of the first priority color.

In the embodiment 5, colors other than the color in complementary color relation with the selected first color and black only are presented to the user as the second color candidate, based on the first color of the two-color printing that has been set in the two-color setting 501 of the operation panel, for example.

The restriction conditions of the selectable priority color used in the embodiment 5 will be described using FIGS. 5 and 7. In the two-color setting 501 that receives the setting of two-color printing, the operation panel that received the basic color setting of the first color from the user notifies the reception to the control unit 202 (step S700).

Figure 7:
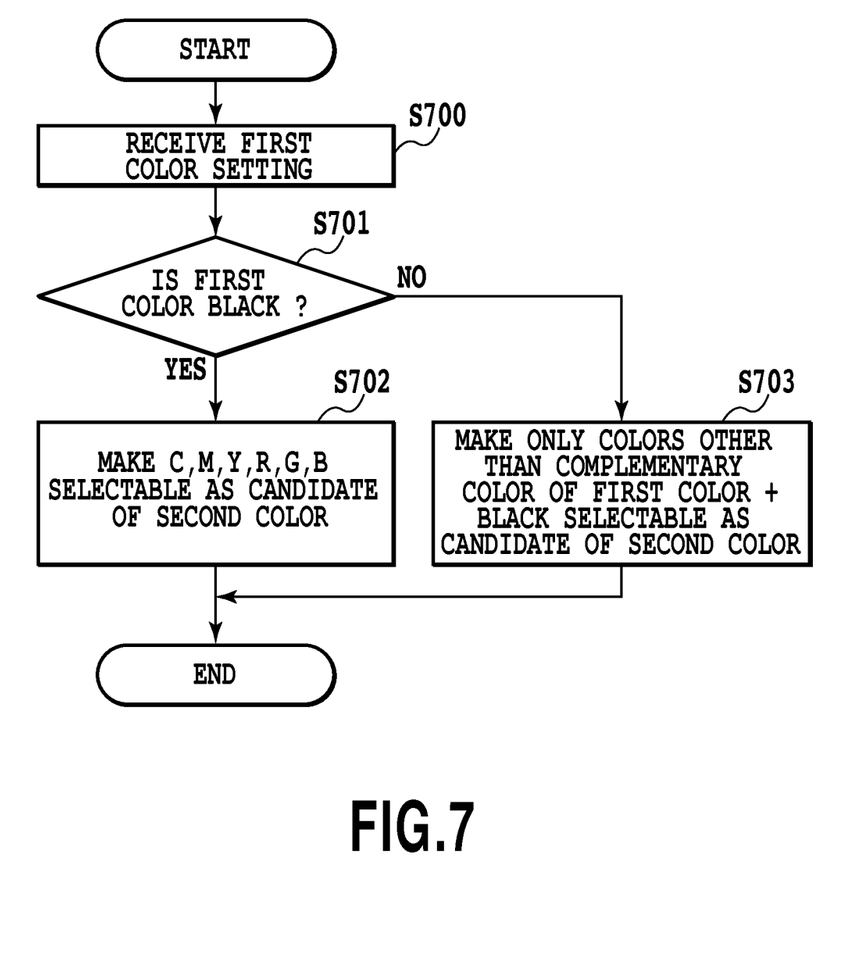
FIG. 7 is a flowchart illustrating an exemplary restriction process in an embodiment 5 of the present invention.

The control unit 202 determines, at step S701 in FIG. 7, the second color restriction condition according to the received first priority color.

If the received first basic color setting is black, all the colors C, M, Y, R, G, B other than black are made selectable, and the selectable colors are reflected in the priority color column of the priority color setting of the operation panel 501 (step S702).

In addition, if the received first basic color setting is other than black, colors other than the color in complementary relation with the first color are made selectable, and the selectable color is reflected in the priority color column of the priority color setting of the operation panel 501 (step S703). For example, if the first basic color setting is red, as shown in FIG. 5, one from three colors, magenta, yellow and black, can be selected as the second priority color setting.

If, for example, the first basic color setting is green, one from three colors, cyan, yellow and black, can be selected as the second priority color setting.

If, for example, the first basic color setting is magenta, one from five colors, cyan, blue, red, yellow and black, can be selected as the second priority color setting. When any color is specified among these five colors, the number of color materials used falls within three colors including black.

It is assumed a color identical to the first color may be selected as a color selectable as the second priority color setting. If the same two colors are determined in the priority color setting, the single-color printing process shown in the embodiment 2 may be performed.

The present invention is not limited to the embodiments described above and illustrated in the drawings and can be implemented through appropriate modifications without deviating from the scope of its spirit.

Embodiment 6

In the embodiment 1, a process flow has been described, which automatically selects and determines the most suitable color as the priority color, and performs printing using the priority color. The embodiment 6 performs printing by automatically switching the number of color materials used to perform printing, when the number of the most suitable color materials in printing is different between the image data in each page to be printed. That is, in the present embodiment, the number of color materials used in printing image data in each page of the plurality of pages included in the image data to be printed is determined for each page, based on the analysis result of step S801.

Figure 9:
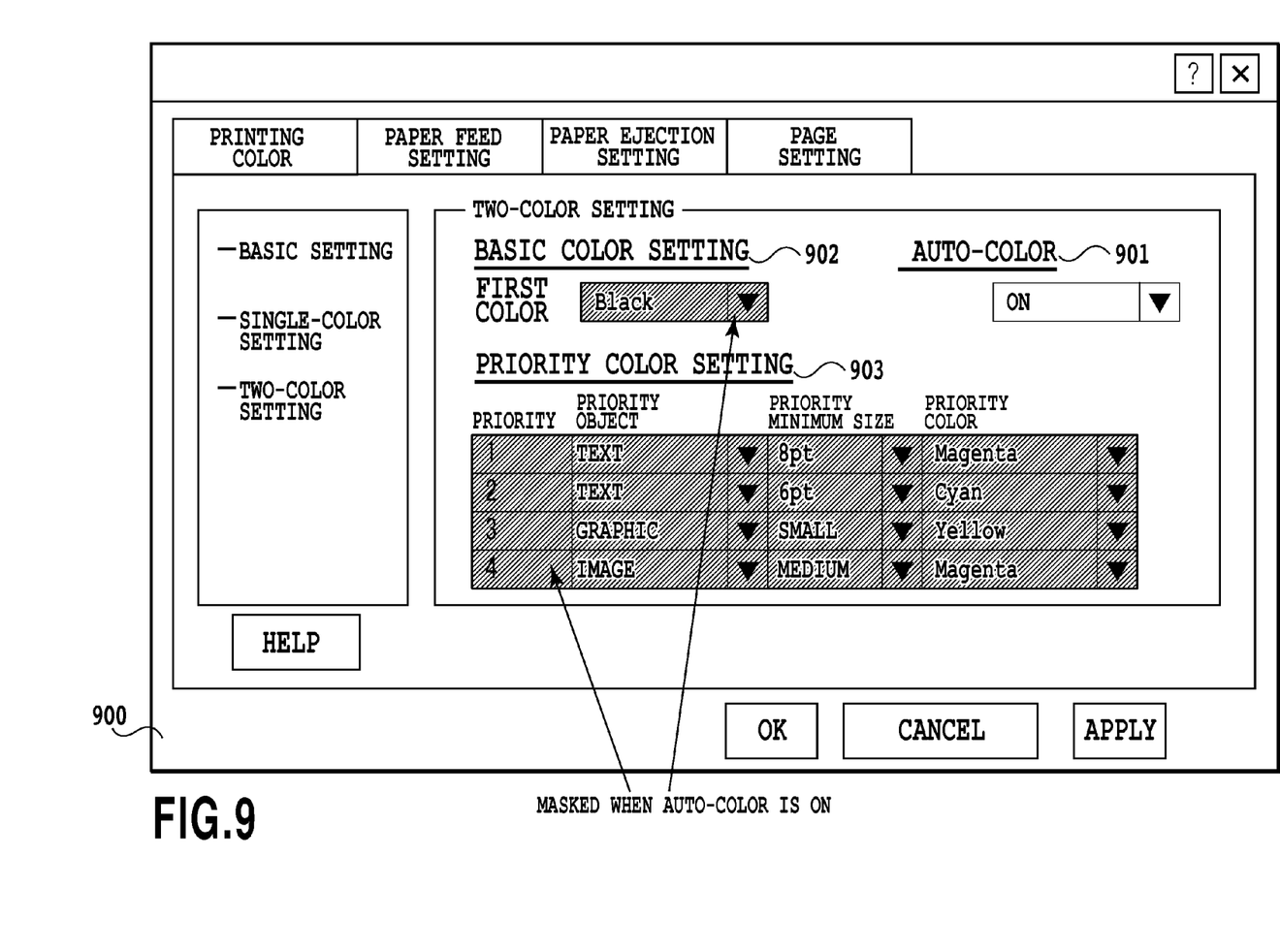
FIG. 9 depicts an exemplary operation panel in the embodiment 6.

For example, in an operation panel 900 shown in FIG. 9, the embodiment 6 is realized by switching ON/OFF an auto color 901. If the auto color 901 is ON, in order to automatically determine the number of color materials, the control unit 202 masks (masking is expressed by the gray-out in FIG. 9) and prohibits a basic color setting 902 and a priority color setting 903. If the auto color 901 is OFF, the control unit 202 unmasks and allows the basic color setting 902 and the priority color setting 903. As a result, the operation panel will have a function identical to that of the embodiment 3 shown in FIG. 4.

Figure 8:
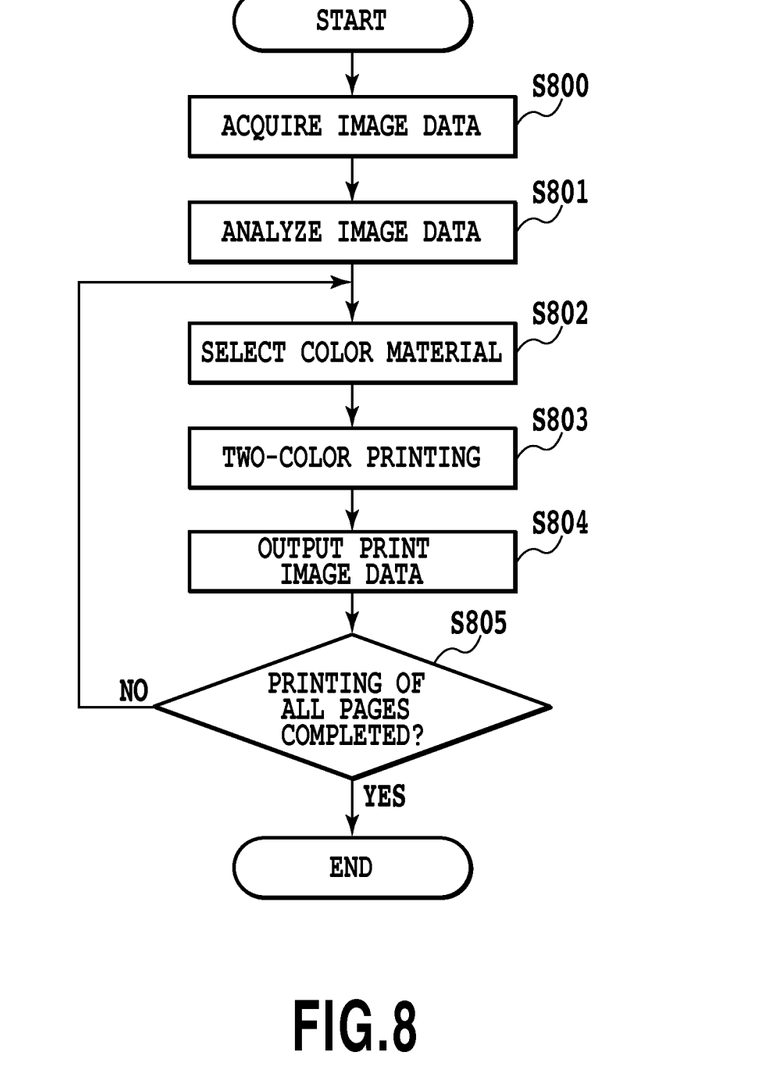
FIG. 8 is a flowchart illustrating an exemplary printing process of an embodiment 6 of the present invention.

Since the process flow is approximately similar to that of FIG. 1 of the embodiment described above, only the different part will be described below using FIG. 8.

The process of step S100 is identical to that of step S800. In addition, the process of step S101 is identical to that of step S801.

At step S802, the control unit 202 checks the analysis result of step S801 (total number of pixels Cr, Cg, Cb, Cc, Cm, Cy and Ck of respective colors R, G, B, C, M, Y and K). Here, Cr, Cg, Cb, Cc, Cm, Cy and Ck are calculated in a manner similar to the embodiment 1. Based on the analysis result of step S801 (type and used amount of colors, etc.), the control unit 202 then automatically determines, among seven candidate colors (R, G, B, C, M, Y and K), the number NN of color materials used to perform printing. When determining the number of color materials, the control unit 202 may set the threshold (T) for the used amount of colors, for example to determine the number of color materials to be used among a combination of colors (R, G, B, C, M, Y and K) whose used amount in the image data is larger than the threshold (T).

For example, if black is the only color that exceeds the threshold (T) in a certain page, the control unit 202 switches the color materials to perform single-color printing, with the number of color materials set to NN=1.

For example, if cyan and magenta are the colors that exceed the threshold (T) in a certain page, the color materials are switched to perform two-color printing using the two color materials of cyan and magenta, with the number of color materials set to NN=2.

For example, if red and black are the colors that exceed the threshold (T) in a certain page, the color materials are switched to perform three-color printing using the three color materials of magenta, yellow and black, with the number of color materials set to NN=3. However, if it is determined that the number of color materials without black is NN=3, i.e., color materials of cyan, magenta and yellow are required, the color materials are assumed to be switched so that full-color printing is performed with the number of color materials set to NN=4.

For example, if cyan, magenta, yellow and black are the colors that exceed the threshold (T) in a certain page, the color materials are switched to perform full-color printing using the four color materials of cyan, magenta, yellow and black, with the number of color materials set to NN=4.

The control unit 202 then generates, at step S803, print image data to print the image using only the color materials determined at step S802, and outputs the print image data to the printing unit 204 at step S804.

The case of NN<=4, for example, will be described below. For example, at step S802, the control unit 202 performs a process similar to the single-color printing process in the embodiment 2 if the number of color materials is NN=1 in the image data acquired at step S800.

For example, at step S802, the control unit 202 performs a process similar to the two-color printing process in the embodiment 1 if number of color materials is NN=2 in the image data acquired at step S800.

For example, at step S802, the control unit 202 performs a process similar to the three-color printing process including black in the embodiment 1 if the number of color materials is NN=3 in the image data acquired at step S800.

For example, at step S802, the control unit 202 performs a process similar to the normal full-color printing process if the number of color materials is NN=4 in the image data acquired at step S800.

For example, if it is determined at step S802 that two color materials of CMYK (e.g., C and M) are used and the number of color materials is determined to NN=2, the control unit 202 sets the density of the remaining two colors (e.g., Y and K) of the CMYK image data to zero for all pixels. In this case, the control unit 202 sets, as the print image data, the CMYK image data with the density of Y and K set to zero for all pixels (step S803). Next, at step S805, if the acquired image data includes a plurality of pages, the control unit 202 determines whether or not all pages have been processed and printing thereof has been completed, and if it is determined that not all of the pages have been printed, the process proceeds to step S802.

If it is determined that all pages have been printed at step S805, the process terminates.

With the above process, it becomes possible to automatically switch among four-color, two-color, and single-color printing, according to the number of color materials that can be loaded on the printing device.

As described above, according to the present invention, an N-color printed matter that is close to the user's request can be generated by automatically determining N priority colors (a number less than M which is the number of color materials that can be loaded on the printing device) that is most suitable for printing the input image data, and performing N-color printing based on the determination result. Furthermore, according to the present invention, since N priority colors that are most suitable for printing the input image data are automatically determined, workload of the user can be reduced when setting colors that are most suitable for printing a matter including a large number of most suitable pages.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-187790, filed Aug. 13, 2009, 2009-258113, filed Nov. 11, 2009, which are hereby incorporated by reference herein in their entirety.

What is claimed is:

1. A printing device constructed to print data using four CMYK colors, comprising:
   a selection unit configured to select two colors from a plurality of colors including C, M, Y, K, R, G and B by analyzing data; and
   a printing unit configured to print the data using three colors from among the four CMYK colors, in a case where the two selected colors are in complementary color relation.

2. The printing device according to claim 1, wherein the selection unit selects two colors that are included most in the data.

3. The printing device according to claim 1, wherein the data is image data.

4. A control method of a printing device constructed to print data using four CMYK colors, the method comprising the steps of:
   selecting two colors from a plurality of colors including C, M, Y, K, R, G and B by analyzing data; and
   printing the data using three colors from among the four colors, in a case where the two selected colors are in complementary color relation.

5. The control method according to claim 4, wherein the selecting step comprises selecting two colors that are included most in the data.

6. A non-transitory computer readable storage medium storing a program for causing a computer to perform the method according to claim 4.

7. A printing device constructed to print input data using four CMYK colors, comprising:
   a generation unit configured to generate CMYK data from input data in a case where the input data is RGB data, and to generate RGB data from input data in a case where the input data is CMYK data;
   a calculation unit configured to calculate a total number of pixels of each of colors R, G, B, C, M, Y and K in the input data and the generated data;
   a selection unit configured to select top two colors having the largest total number of pixels from R, G, B, C, M, Y and K based on the total number of pixels acquired by the calculation unit; and
   a printing unit configured to print the input data using three colors of the four CMYK colors, in a case where the selected top two colors are in complementary color relation.

8. A control method of a printing device constructed to print input data using four CMYK colors, the method comprising the steps of:
   generating CMYK data from input data in a case where the input data is RGB data, and generating RGB data from input data in a case where the input data is CMYK data;
   calculating a total number of pixels of each of colors R, G, B, C, M, Y and K in the input data and the generated data;
   selecting top two colors having the largest total number of pixels from R, G, B, C, M, Y and K based on the total number of pixels acquired in the calculating step; and
   printing the input data using three colors of the four CMYK colors, in a case where the selected top two colors are in complementary color relation.

* * * * *